(12) United States Patent
Liu et al.

(10) Patent No.: US 12,124,041 B2
(45) Date of Patent: Oct. 22, 2024

(54) HEAD MOUNTED DISPLAY DEVICE TO PROVIDE ADJUSTABLE CLAMPING FORCE

(71) Applicant: HTC Corporation, Taoyuan (TW)

(72) Inventors: Wei-Cheng Liu, Taoyuan (TW); Chun-Lung Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/087,827

(22) Filed: Dec. 23, 2022

(65) Prior Publication Data

US 2024/0045218 A1 Feb. 8, 2024

Related U.S. Application Data

(60) Provisional application No. 63/394,622, filed on Aug. 3, 2022.

(51) Int. Cl.
G02B 27/01 (2006.01)

(52) U.S. Cl.
CPC .. G02B 27/0176 (2013.01); *G02B 2027/0154* (2013.01)

(58) Field of Classification Search
CPC .............. G02B 27/0176; G02B 2027/0154
See application file for complete search history.

(56) References Cited

U.S. PATENT DOCUMENTS

| | | | | |
|---|---|---|---|---|
| 6,424,321 B1 * | 7/2002 | Ronzani | ............ | G02B 27/0176 345/87 |
| 6,480,174 B1 * | 11/2002 | Kaufmann | ......... | G02B 27/0172 359/13 |
| 7,542,012 B2 * | 6/2009 | Kato | .................. | G02B 27/0176 345/1.1 |
| 8,777,406 B2 * | 7/2014 | Sugihara | ................. | G02C 9/04 351/158 |
| 10,268,042 B2 * | 4/2019 | Kamakura | ......... | G02B 27/0176 |
| 2008/0309588 A1 * | 12/2008 | Miyake | .............. | G02B 27/0176 345/8 |
| 2009/0128450 A1 * | 5/2009 | Nakabayashi | ..... | G02B 27/0176 345/8 |
| 2014/0375947 A1 | 12/2014 | Park et al. | | |
| 2016/0246059 A1 * | 8/2016 | Halpin | ............... | G02B 27/0176 |
| 2018/0017208 A1 * | 1/2018 | Shanley, IV | .......... | F16M 13/04 |

(Continued)

FOREIGN PATENT DOCUMENTS

| | | |
|---|---|---|
| CN | 209590414 | 11/2019 |
| TW | 202008028 | 2/2020 |
| TW | 202028931 | 8/2020 |

OTHER PUBLICATIONS

"Office Action of Taiwan Counterpart Application", issued on May 18, 2023, p. 1-p. 7.

*Primary Examiner* — William Boddie
*Assistant Examiner* — Bipin Gyawali
(74) *Attorney, Agent, or Firm* — JCIPRNET

(57) ABSTRACT

A head mounted display device including a host, two brackets, and two rotating components is provided. The two brackets are respectively pivotally connected to opposite sides of the host. Each bracket includes a first segment and a second segment. The first segment is pivotally connected to the second segment, and the first segment is pivotally connected to the host. The two rotating components are respectively assembled to the first segment and the second segment of each bracket to control an angle between the first segment and the second segment.

3 Claims, 5 Drawing Sheets

(56) References Cited

U.S. PATENT DOCUMENTS

| | | | | |
|---|---|---|---|---|
| 2018/0373031 A1* | 12/2018 | Nakayama | ......... | G03B 21/2066 |
| 2020/0089003 A1* | 3/2020 | Lee | ......... | G06F 3/011 |
| 2020/0403278 A1* | 12/2020 | Jhawar | ......... | H01M 10/44 |
| 2022/0121032 A1* | 4/2022 | Serizawa | ......... | G02B 7/12 |
| 2023/0238637 A1* | 7/2023 | Wu | ......... | H01M 50/50 |
| | | | | 429/98 |

* cited by examiner

HEAD MOUNTED DISPLAY DEVICE TO PROVIDE ADJUSTABLE CLAMPING FORCE

CROSS-REFERENCE TO RELATED APPLICATION

This application claims the priority benefit of U.S. provisional application Ser. No. 63/394,622, filed on Aug. 3, 2022. The entirety of the above-mentioned patent application is hereby incorporated by reference herein and made a part of this specification.

BACKGROUND

Technical Field

The present disclosure relates to a display device, and particularly relates to a head mounted display device.

Description of Related Art

As the technology industry develops day by day, the types, functions and ways of use of display devices are becoming more and more diverse, and head mounted display devices that can be directly worn on the head of users have also emerged accordingly. There are many types of head mounted display devices. Take the glasses-type head mounted display device as an example. When the user is wearing this type of display device, other than stereoscopic images may be seen, the images also change as the user rotates the head, which can provide the user with a more immersive feeling.

However, the clamping force required for the head mounted display device in different usage scenarios is different, and each person's head size and shape is different. Therefore, it is necessary for the head mounted display device to provide an adjustable clamping force to improve wearing comfort and prevent the head mounted display device from being damaged due to falling.

SUMMARY

The present disclosure provides a head mounted display device, which can provide an adjustable clamping force.

The head mounted display device of the present disclosure includes a host, two brackets, and two rotating components. The two brackets are respectively pivotally connected to opposite sides of the host. Each bracket includes a first segment and a second segment. The first segment is pivotally connected to the second segment, and the first segment is pivotally connected to the host. The two rotating components are respectively assembled to the first segment and the second segment of each bracket to control an angle between the first segment and the second segment.

Based on the above, in the head mounted display device of the present disclosure, the angle between the first segment and the second segment of the bracket can be controlled, so that an adjustable clamping force can be provided.

DESCRIPTION OF THE EMBODIMENTS

Figure 1:
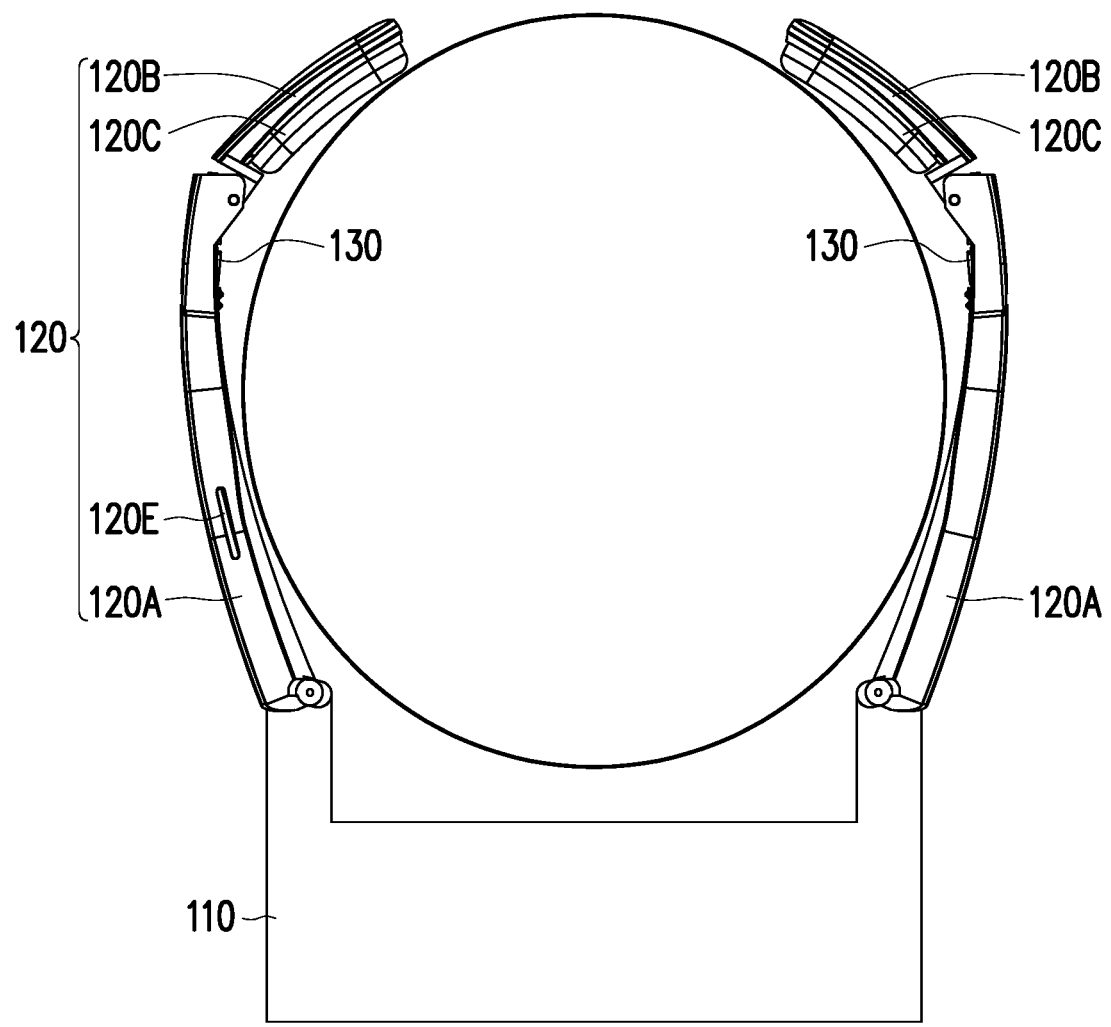
FIG. 1 is a schematic diagram of a head mounted display device according to an embodiment of the invention.
Figure 2:
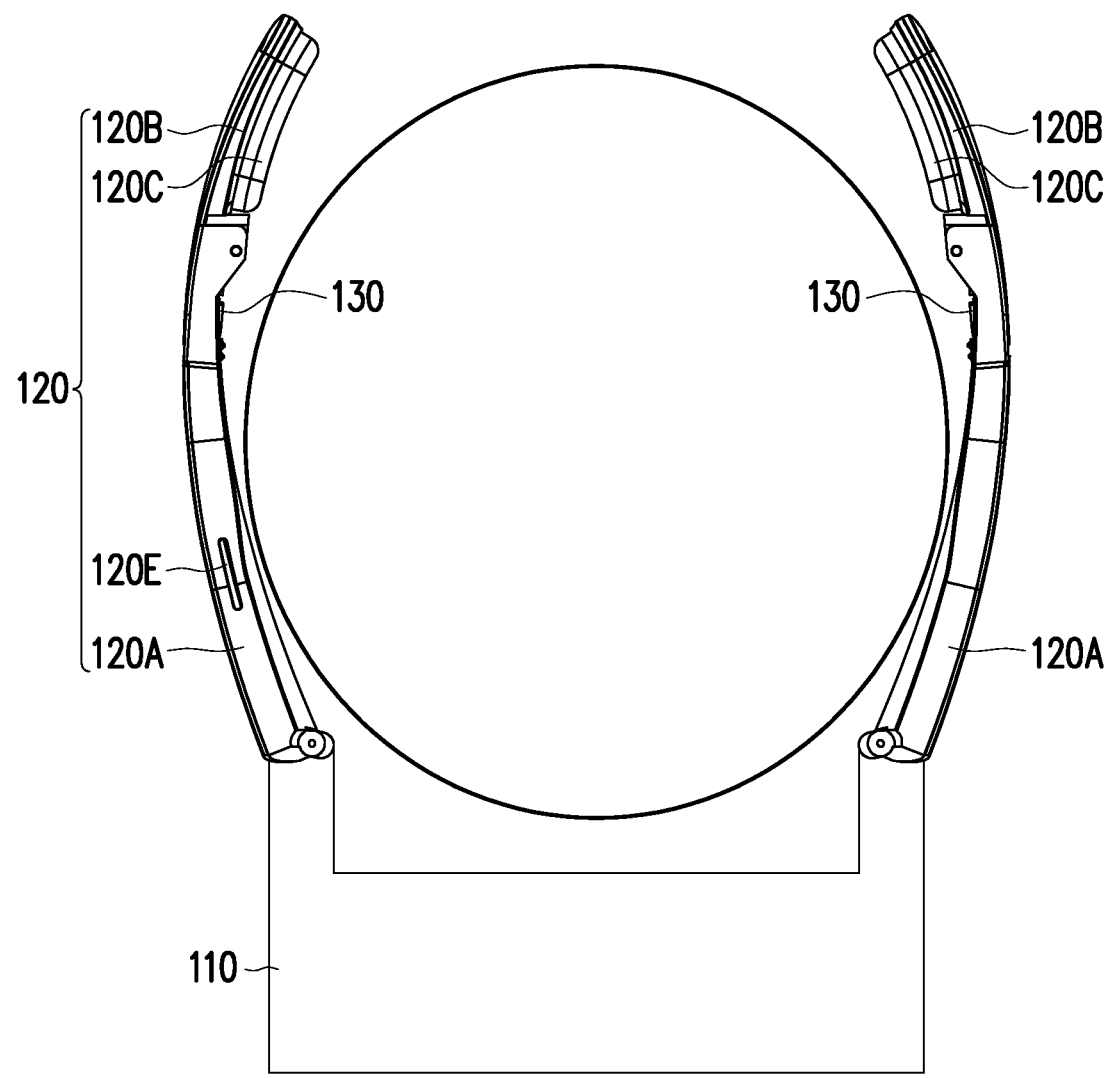
FIG. 2 is a schematic diagram of the head mounted display device in FIG. 1 worn on another user's head.

FIG. 1 is a schematic diagram of a head mounted display device according to an embodiment of the invention. FIG. 2 is a schematic diagram of the head mounted display device in FIG. 1 worn on another user's head. Referring to FIG. 1 and FIG. 2, a head mounted display device 100 of this embodiment includes a host 110, two brackets 120, and two rotating components 130. The two brackets 120 are respectively pivotally connected to opposite sides of the host 110. Each bracket 120 includes a first segment 120A and a second segment 120B. The first segment 120A is pivotally connected to the second segment 120B, and the first segment 120A is pivotally connected to a host. Each rotating component 130 is assembled to the first segment 120A and the second segment 120B of a corresponding bracket 120 to control an angle between the first segment 120A and the second segment 120B.

Because the rotating component 130 can control the angle between the first segment 120A and the second segment 120B, after the head mounted display device 100 is worn on the user's head, the angle between the first segment 120A and the second segment 120B may be adjusted so that both the first segment 120A and the second segment 120B may fit the user's head as closely as possible. In this way, the head mounted display device 100 may be firmly worn on the user's head. In games or other situations that require more intense body movements, the angle between the first segment 120A and the second segment 120B may be moderately reduced to provide a firmer fixation effect. In relatively mild virtual situations, the angle between the first segment 120A and the second segment 120B may also be moderately enlarged to improve comfort. In addition, even if different users have different head shapes and head circumferences also differ, the head mounted display device 100 can be firmly worn on the heads of different users by adjusting the angle between the first segment 120A and the second segment 120B.

When the host 110 is equipped with a mask, moderately reducing the angle between the first segment 120A and the second segment 120B can also move the host 110 toward the user's face, so that the mask is more closely attached to the user's face, and the light from the outside world can be truly covered to reduce the interference that the user receives when watching images and improves the user experience.

In this embodiment, the host 110 is a head mounted display which, for example, may be applied to a virtual reality system, an augmented reality system or a mixed reality system, etc. The host 110 may include components such as an optical system and a protective casing, and may be provided with or adapted to place a display. The aforementioned display may be a built-in display or an additional portable display (such as a smart phone, etc.), but the disclosure is not limited thereto. The optical system includes optical elements for changing an optical path of the display, such as lenses, light guides, or prisms. The host 110 in FIG. 1 is presented in a larger volume, but the host 110 may also be in a shape similar to glasses or in other shapes.

In this embodiment, each bracket 120 further includes a cushion 120C assembled to the second segment 120B and used to contact the back of the user's head. For example, when the head mounted display device 100 is worn on the user's head, the bracket 120 is sandwiched between the ear and the skull, which is the same as temples of ordinary glasses, and the cushion 120C is used for contacting a part of the user's head behind the ears to increase the wearing comfort and stability.

In this embodiment, each bracket further includes a switching 120E disposed on the first segment 120A and used to actuate the rotating component 130 to change the angle between the first segment 120A and the second segment 120B when the user activates the switching 120E. For example, when the user wants to adjust a clamping force, the user may activate the switching 120E to make the rotating component 130 start to rotate to change the angle between the first segment 120A and the second segment 120B. The switching 120E may be a mechanical switching or a touch switching, which is not limited in this disclosure. In addition, the switching 120E may also be disposed on the host 110, the second segment 120B or other appropriate positions. With proper design, when the user wants to wear the head mounted device 100 and picks up the head mounted device 100, the user can naturally touch the switching 120E to activate the rotating component 130. In this way, a most intuitive and convenient user experience can be provided. In addition, the user may activate the switching 120E again to end an adjustment of the angle. The head mounted display device 100 may further include a stress sensor 140 disposed on the cushion 120C or other appropriate positions, so as to stop the rotating component 130 at an appropriate time according to a sensing result of the stress sensor 140 to end an angle adjustment. Alternatively, a user option may be provided in a user interface, and the angle may be adjusted to a pre-stored value according to the option selected by the user.

Figure 3:
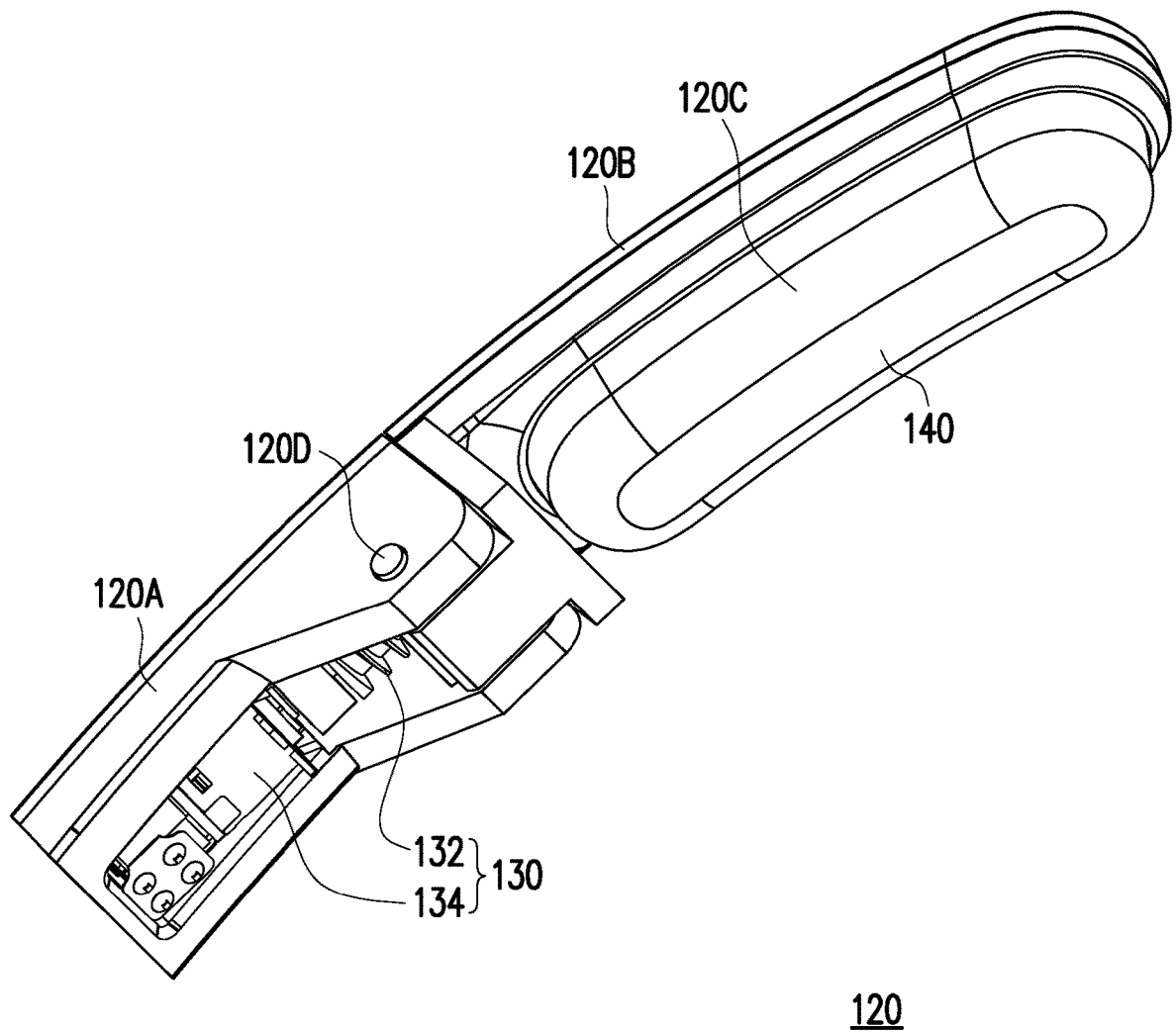
FIG. 3 is a partially enlarged diagram of a bracket of the head mounted display device in FIG. 1.
Figure 4:
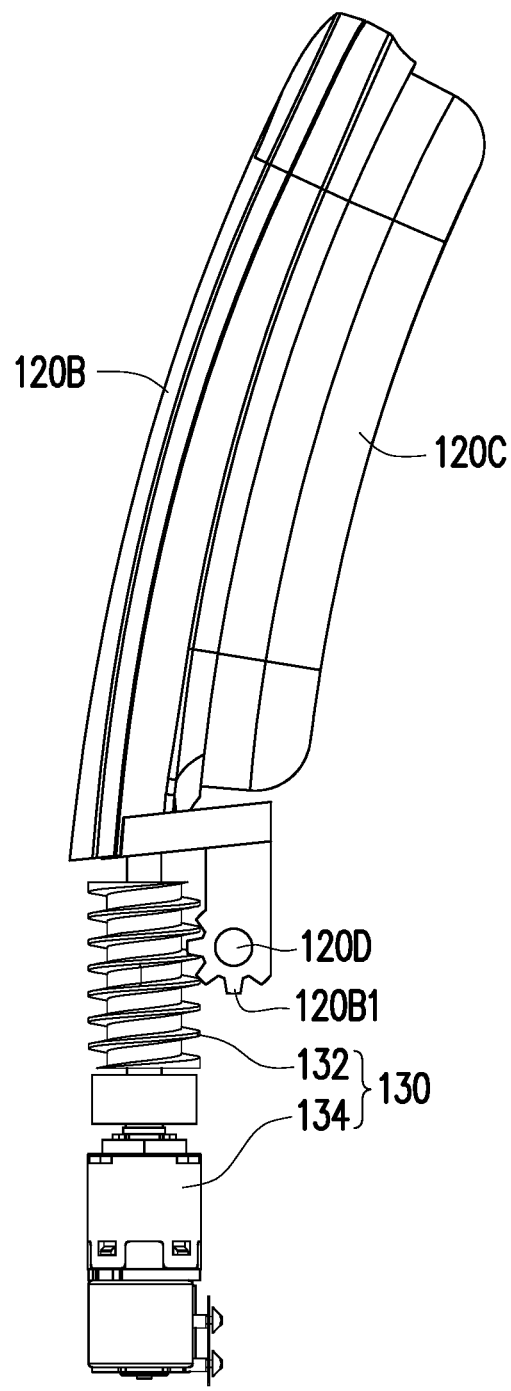
FIG. 4 and FIG. 5 are partially enlarged schematic diagrams of the bracket of the head mounted display device in FIG. 1 in two different states.
Figure 5:
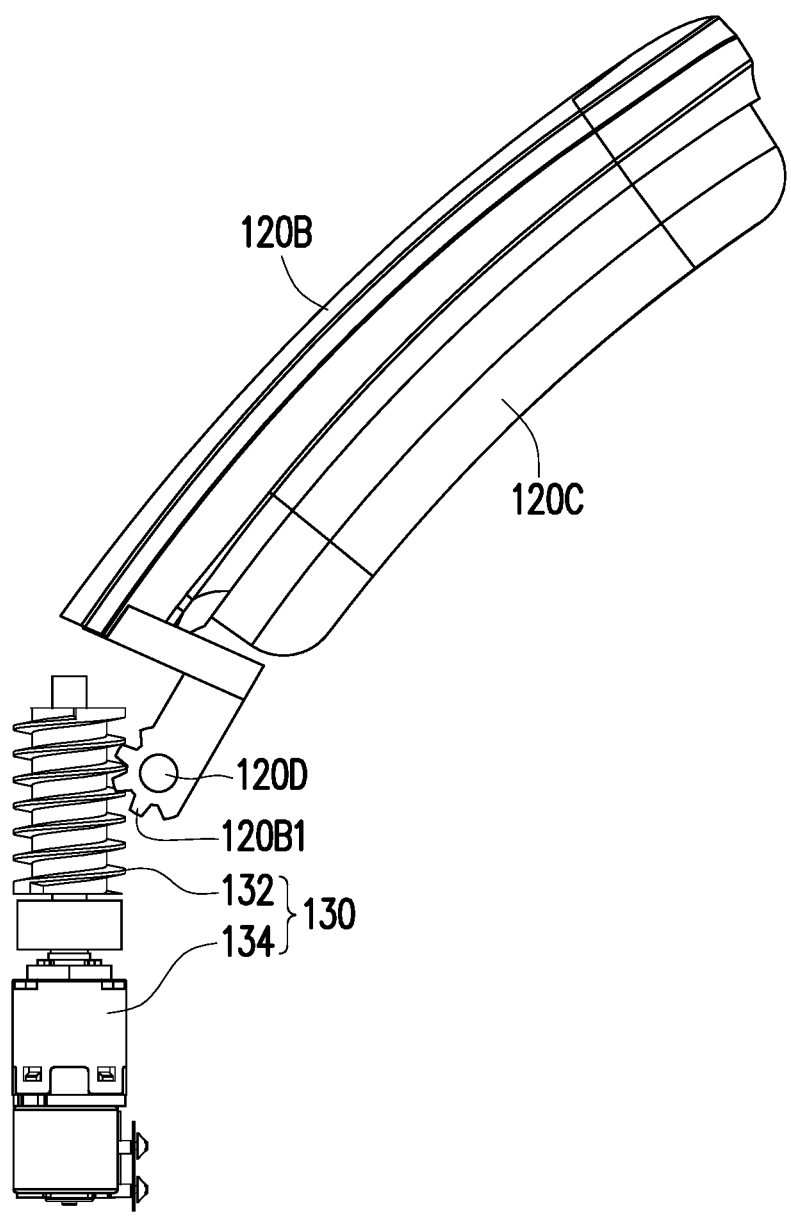

FIG. 3 is a partially enlarged diagram of the bracket of the head mounted display device in FIG. 1. FIG. 4 and FIG. 5 are partially enlarged schematic diagrams of the bracket of the head mounted display device in FIG. 1 in two different states. Please refer to FIG. 3 and FIG. 4. In this embodiment, the rotating component 130 includes a motor 132 and a screw 134. The second segment 120B has a gear part 120B1. The motor 132 is assembled to the first segment 120A and used to rotate the screw 134. The screw 134 engages the gear part 120B1 to drive the second segment 120B to rotate relative to the first segment 120A. Please refer to FIG. 4 and FIG. 5. When the motor 132 rotates the screw 134, the gear part 120B1 engaged with the screw 134 is rotated, that is, the second segment 120B rotates relative to the first segment 120A.

In this embodiment, each bracket 120 further includes a rotating shaft 120D. The rotating shaft 120D passes through the first segment 120A and the second segment 120B. The gear part 120B1 is adapted to rotate around the rotating shaft 120D. That is, because the first segment 120A and the second segment 120B are passed through by the rotating shaft 120D and pivotally connected to each other, when teeth of the gear part 120B1 around the rotating shaft 120D are moved by the screw 134, the second segment 120B also goes around the rotating shaft 120D and rotate relative to the first segment 120A.

To sum up, in the head mounted display device of the present disclosure, the bracket includes two segments pivotally connected to each other, which can preferably fit the user's head closely. Moreover, the rotating component can control the angle between a first segment and a second segment, so as to adjust the clamping force according to the demand, and can adapt to the head shape and head circumference of different users. In this way, even though the weight of the head mounted display device increases as more components are used, it can still be worn on the user's head stably. In a usage scenario where a body shakes a lot, the angle between the first segment and the second segment may be reduced to provide a firm fixation effect. In a usage scenario where the body shakes slightly, the angle between the first segment and the second segment may be moderately enlarged to improve comfort.

What is claimed is:

1. A head mounted display device, comprising:
    a host;
    two brackets respectively pivotally connected to opposite sides of the host, wherein each of the brackets comprises a first segment and a second segment, the first segment is pivotally connected to the second segment, the first segment is pivotally connected to the host, the second segment is located corresponding to a part of a user's head behind ears, and each of the brackets further comprises a cushion assembled to the second segment and used to contact the part of the user's head behind the ears;
    two rotating components respectively assembled to the first segment and the second segment of each of the brackets to control an angle between the first segment and the second segment;
    a stress sensor disposed on the corresponding cushion and used to stop the rotating components according to a sensing result; and
    a switching, disposed on the corresponding first segment, wherein the switching is adapted to actuate the rotating components to change the angles between the first segments and the second segments.

2. The head mounted display device according to claim 1, wherein each of the rotating components comprises a motor and a screw, each of the second segments has a gear part, the motor is assembled to the first segment and used to rotate the screw, and the screw engages the gear part to drive the second segment to rotate relative to the first segment.

3. The head mounted display device according to claim 2, wherein each of the brackets further comprises a rotating shaft, wherein the rotating shaft passes through the first segment and the second segment, and the gear part is adapted to rotate around the rotating shaft.

* * * * *